(12) United States Patent
Bloemendaal et al.

(10) Patent No.: US 11,623,829 B2
(45) Date of Patent: Apr. 11, 2023

(54) BIN SWEEP SYSTEM WITH CONTOURED PADDLES

(71) Applicants: Brent J. Bloemendaal, Zionsville, IN (US); Brian Schuelke, Lennox, SD (US)

(72) Inventors: Brent J. Bloemendaal, Zionsville, IN (US); Brian Schuelke, Lennox, SD (US)

(73) Assignee: Sioux Steel Company, Sioux Falls, SD (US)

( * ) Notice: Subject to any disclaimer, the term of this patent is extended or adjusted under 35 U.S.C. 154(b) by 0 days.

(21) Appl. No.: 17/392,506

(22) Filed: Aug. 3, 2021

(65) Prior Publication Data

US 2021/0362967 A1  Nov. 25, 2021

Related U.S. Application Data

(63) Continuation of application No. 16/804,298, filed on Feb. 28, 2020, now Pat. No. 11,104,528.

(60) Provisional application No. 62/815,827, filed on Mar. 8, 2019.

(51) Int. Cl.
*B65G 65/42* (2006.01)

(52) U.S. Cl.
CPC .................. *B65G 65/425* (2013.01)

(58) Field of Classification Search
CPC ............... B65G 65/425; B65G 65/42
See application file for complete search history.

(56) References Cited

U.S. PATENT DOCUMENTS

| | | | |
|---|---|---|---|
| 822,547 | A | 6/1906 | Nicolson |
| 2,646,023 | A | 7/1953 | Virgil |
| 2,722,305 | A | 11/1955 | Mccabe |
| 2,736,461 | A | 2/1956 | Dueringer |
| 2,763,362 | A | 9/1956 | Greaves |
| 2,801,137 | A | 7/1957 | Clay |
| 2,948,422 | A | 8/1960 | Hilderbrand |
| 3,014,575 | A | 12/1961 | Klein |

(Continued)

FOREIGN PATENT DOCUMENTS

| | | |
|---|---|---|
| CA | 2312068 | 12/2001 |
| FR | 1032110 | 6/1953 |

(Continued)

OTHER PUBLICATIONS

G & G Manufacturing SC-X4" Ratchet Slip Clutches.

(Continued)

*Primary Examiner* — Jonathan Snelting
(74) *Attorney, Agent, or Firm* — Jeffrey A. Proehl; Woods, Fuller, Shultz & Smith, PC

(57) ABSTRACT

A storage bin sweep system including a sweep assembly having an inboard end, an outboard end, a forward side and a rearward side and including a sweep housing extending between the inboard and outboard ends, a plurality of paddles movable on a path extending along at least a portion of the sweep assembly between the inboard and outboard ends, and an endless loop member mounted on the sweep housing and on which the plurality of paddles are mounted at spaced locations along the endless loop member. At least one of the paddles may have a front surface contoured in a manner to urge particles located forward of the paddle toward the rearward side of the sweep assembly as the paddle moves toward the inboard end of the sweep assembly.

20 Claims, 10 Drawing Sheets

(56) References Cited

U.S. PATENT DOCUMENTS

| | | |
|---|---|---|
| 3,035,718 A | 5/1962 | Behlen |
| 3,065,996 A | 11/1962 | Patz |
| 3,067,914 A | 12/1962 | Ellaby |
| 3,175,676 A | 3/1965 | Vander Schaaf |
| 3,181,715 A | 5/1965 | Olson |
| 3,204,786 A | 9/1965 | Kucera |
| 3,228,514 A | 1/1966 | Kucera |
| 3,229,665 A | 1/1966 | Baltz |
| 3,229,827 A | 1/1966 | Kucera |
| 3,231,106 A | 1/1966 | Bruecker |
| 3,291,325 A | 12/1966 | Henningson |
| 3,297,146 A | 1/1967 | Munger |
| 3,338,636 A | 8/1967 | Chapman |
| 3,438,517 A | 4/1969 | Steffen |
| 3,451,567 A | 6/1969 | Laidig |
| 3,455,470 A | 7/1969 | Kanagy |
| 3,472,357 A | 10/1969 | Strocker |
| 3,486,643 A | 12/1969 | Smith |
| 3,532,232 A | 10/1970 | Sukup |
| 3,647,094 A | 3/1972 | Jackson |
| 3,828,916 A | 8/1974 | Patz |
| 3,838,780 A | 10/1974 | Ridlehuber |
| 3,908,840 A | 9/1975 | Lambert |
| 3,946,496 A | 3/1976 | Sukup |
| 3,946,861 A | 3/1976 | Sandefur |
| 3,974,908 A | 8/1976 | Keichinger |
| 3,986,600 A | 10/1976 | Pentith |
| 4,003,481 A | 1/1977 | Proctor |
| 4,022,335 A | 5/1977 | Lambert |
| RE29,309 E | 7/1977 | Patterson |
| RE29,386 E | 9/1977 | Miksitz |
| 4,057,151 A | 11/1977 | Weaver |
| 4,230,222 A | 10/1980 | Clark |
| 4,242,028 A | 12/1980 | Van Dusen |
| 4,313,705 A | 2/1982 | Jackson |
| 4,329,105 A | 5/1982 | Buschbom |
| 4,451,192 A | 5/1984 | Wood |
| 4,516,898 A | 5/1985 | Cantenot |
| 4,578,012 A | 3/1986 | Petit |
| 4,583,903 A | 4/1986 | Hutchison |
| 4,585,385 A | 4/1986 | Buschbom |
| 4,619,330 A | 10/1986 | Machnee |
| 4,619,577 A | 10/1986 | Swanson |
| 4,621,968 A | 11/1986 | Hutchison |
| 4,669,941 A | 2/1987 | West |
| 4,655,666 A | 4/1987 | Cantenot |
| 4,658,911 A | 4/1987 | Drever |
| 4,671,727 A | 6/1987 | Hlinka |
| 4,762,220 A | 8/1988 | Lutke |
| 4,773,808 A | 9/1988 | Fischer |
| 4,775,278 A | 10/1988 | Fischer |
| 4,824,312 A | 4/1989 | Schiltz |
| 4,875,820 A | 10/1989 | Lepp |
| 4,998,855 A | 3/1991 | Tschernatsch |
| 5,088,871 A | 2/1992 | Mellish |
| 5,099,983 A | 3/1992 | Valdez |
| 5,180,272 A | 1/1993 | Campbell |
| 5,186,596 A | 2/1993 | Boucher |
| 5,203,802 A | 4/1993 | Denis |
| 5,540,533 A | 7/1996 | Eskelinen |
| 5,639,200 A | 6/1997 | Jiskoot |
| 5,769,590 A | 6/1998 | Weikel |
| 5,788,055 A | 8/1998 | Stewart |
| 5,944,168 A | 8/1999 | Campbell |
| 5,947,261 A | 9/1999 | Baker |
| 5,952,584 A | 9/1999 | Strubbe |
| 6,017,180 A | 1/2000 | Wilham |
| 6,039,647 A | 3/2000 | Weikel |
| 6,095,742 A | 8/2000 | Campbell |
| 6,203,261 B1 | 3/2001 | South |
| 6,254,329 B1 | 7/2001 | Sukup |
| 6,280,331 B1 | 8/2001 | Tuttlebee |
| 6,281,610 B1 | 8/2001 | Kliman |
| 6,499,930 B1 | 12/2002 | Dixon |
| 6,619,473 B2 | 9/2003 | Romeo |
| 6,640,451 B1 | 11/2003 | Vinarcik |
| 6,672,342 B2 | 1/2004 | Nussbaumer |
| 6,948,902 B2 | 9/2005 | Hanig |
| 7,210,538 B2 | 5/2007 | Gust |
| 7,544,031 B2 | 6/2009 | Kaeb |
| 7,588,405 B2 | 9/2009 | Johnson |
| 7,967,542 B2 | 6/2011 | Epp |
| 8,328,496 B2 | 12/2012 | Cernik |
| 8,657,025 B2 | 2/2014 | Thompson |
| 8,770,388 B1 | 7/2014 | Chaon |
| 9,120,633 B2 | 9/2015 | Ahlen |
| 9,199,807 B1 | 12/2015 | Schuelke |
| 9,288,946 B1 | 3/2016 | Schuld |
| 9,290,335 B1 | 3/2016 | Witt |
| 9,862,545 B2 | 1/2018 | Kaeb |
| 10,220,420 B2 | 3/2019 | Witt |
| 10,227,188 B1 | 3/2019 | Chaon |
| 10,238,042 B2 | 3/2019 | Ahlen |
| 10,442,641 B2 | 10/2019 | Nelson |
| 2004/0146381 A1 | 7/2004 | Hanson |
| 2004/0213650 A1 | 10/2004 | Epp |
| 2005/0254922 A1 | 11/2005 | Berraeu |
| 2005/0263372 A1 | 12/2005 | Hollander |
| 2006/0245864 A1 | 11/2006 | Epp |
| 2006/0285942 A1 | 12/2006 | Fridgen |
| 2009/0041566 A1 | 2/2009 | Lambertini |
| 2010/0239399 A1 | 9/2010 | Hoogestraat |
| 2013/0064629 A1 | 3/2013 | Schuelke |
| 2013/0216341 A1 | 8/2013 | Luster |
| 2015/0225190 A1 | 8/2015 | Witt |
| 2016/0052719 A1 | 2/2016 | Ganzer |

FOREIGN PATENT DOCUMENTS

| | | |
|---|---|---|
| FR | 2309442 | 11/1976 |
| FR | 2348132 | 11/1977 |
| FR | 2630620 | 11/1989 |
| GB | 1327791 | 8/1973 |
| GB | 2069448 | 8/1981 |
| GB | 2076357 | 12/1981 |

OTHER PUBLICATIONS

Sudenga Industries, Inc., Press Release, Nov. 1, 2004.
Wen-Bin Du, Qun Fang, Qiao-Hong He, and, and Zhao-Lun Fang. "High-Throughput Nanoliter Sample Introduction Microfluidic Chip-Based Flow Injection Analysis System with Gravity-Driven Flows", Analytical Chemistry 2005 77 (5), pp. 1330-1337.
Jayas, Digvir S., and Noel DG White. "Storage and drying of grain in Canada: low cost approaches." Food control 14.4 (2003); pp. 255-261.

BIN SWEEP SYSTEM WITH CONTOURED PADDLES

REFERENCE TO RELATED APPLICATIONS

This application is a continuation of U.S. patent application Ser. No. 16/804,298, filed Feb. 28, 2020, which claimed the benefit of the priority of U.S. Provisional Patent Application No. 62/815,827, filed Mar. 8, 2019, each of which is hereby incorporated by reference in its entirety.

BACKGROUND

Field

The present disclosure relates to bin sweeps and more particularly pertains to a new bin sweep system with contoured paddles for retaining particles on the paddles during movement.

SUMMARY

In one aspect, the present disclosure relates to a storage bin sweep system utilizing paddles to sweep particles across a floor surface of a bin. The system may comprise a sweep assembly having an inboard end for locating toward to a central area of the bin and an outboard end for locating toward a peripheral area of the bin, as well as a forward side oriented toward a direction of movement of the sweep and a rearward side oriented away from the direction of movement. The sweep assembly may comprise a sweep housing extending between the inboard and outboard ends of the sweep assembly, a plurality of paddles movable on a path extending along at least a portion of the sweep assembly between the inboard and outboard ends, and an endless loop member mounted on the sweep housing and on which the plurality of paddles are mounted at spaced locations along the endless loop member. At least one of the paddles may have a front surface contoured in a manner to urge particles located forward of the paddle toward the rearward side of the sweep assembly as the paddle moves toward the inboard end of the sweep assembly.

In another aspect, the disclosure relates to a paddle for sweeping particles by a storage bin sweep assembly moving in a forward direction across a floor surface of a bin, the sweep assembly has a forward side oriented toward the forward direction and a rearward side, and may have a rearward wall located toward the rearward side and extending downwardly toward the floor surface below the sweep assembly. The paddle may be mountable on the sweep assembly as one of a plurality of paddles movable on a path extending along at least a portion of a length of the sweep assembly between inboard and outboard ends of the assembly. The paddle has a front with a front surface oriented toward a movement direction of the plurality of paddles and a rear oriented away from the movement direction of the plurality of paddles. The front surface of the paddle may be contoured in a manner to urge particles located forward of the paddle toward the rearward side of the sweep assembly as the paddle moves toward the inboard end of the sweep assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
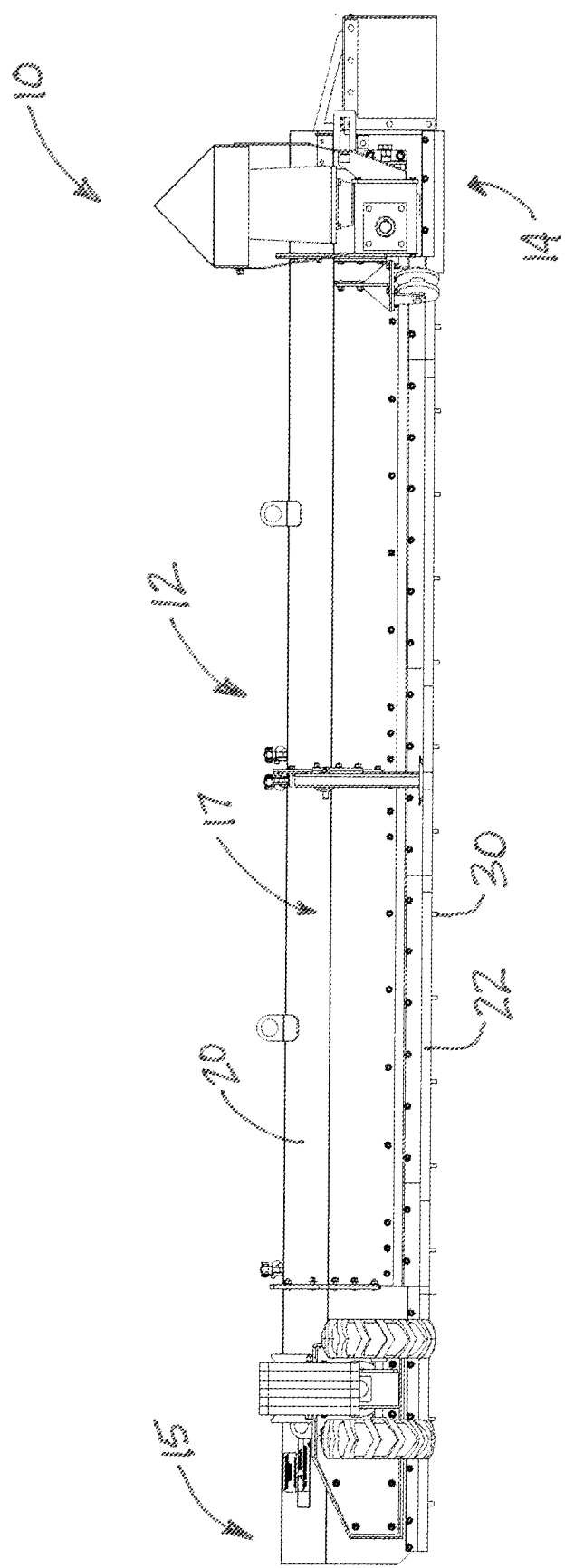
FIG. 1 is a schematic side view of an illustrative bin sweep system employing contoured paddles according to the present disclosure.
Figure 2:
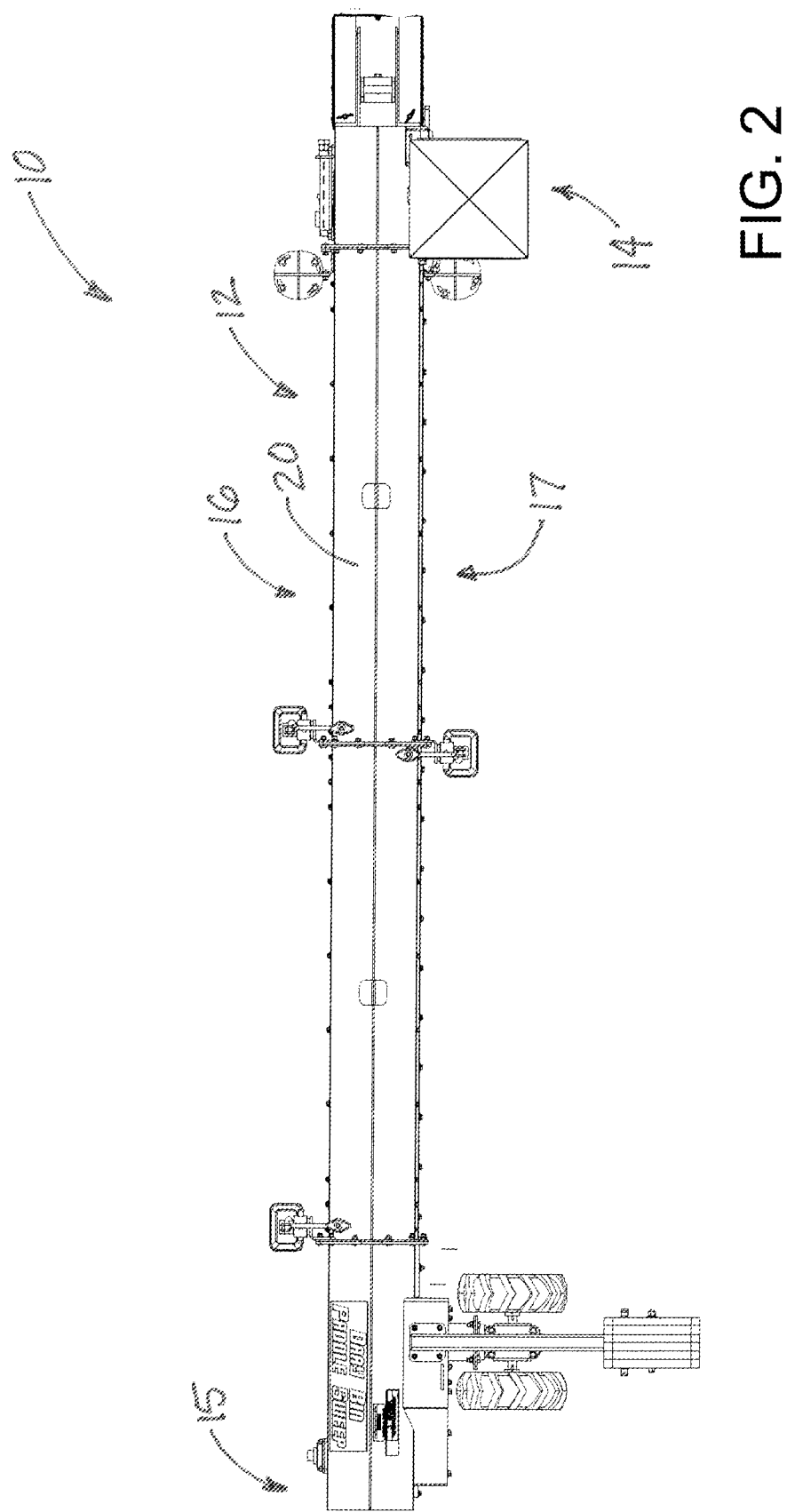
FIG. 2 is a schematic top view of the illustrative bin sweep system employing contoured paddles, according to an illustrative embodiment.
Figure 3:
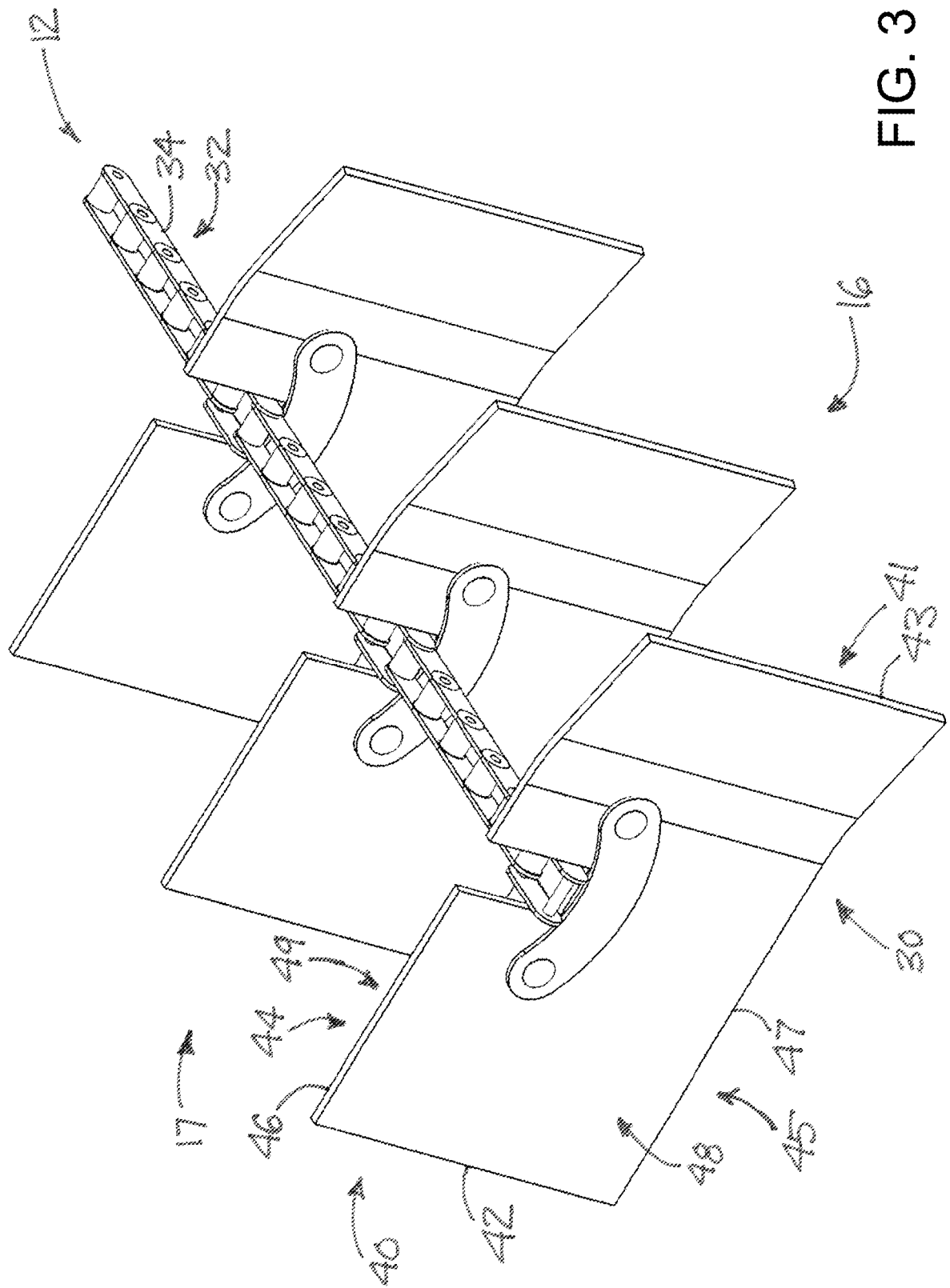
FIG. 3 is a schematic perspective view of a portion of the succession of contoured paddles, according to an illustrative embodiment.
Figure 4:
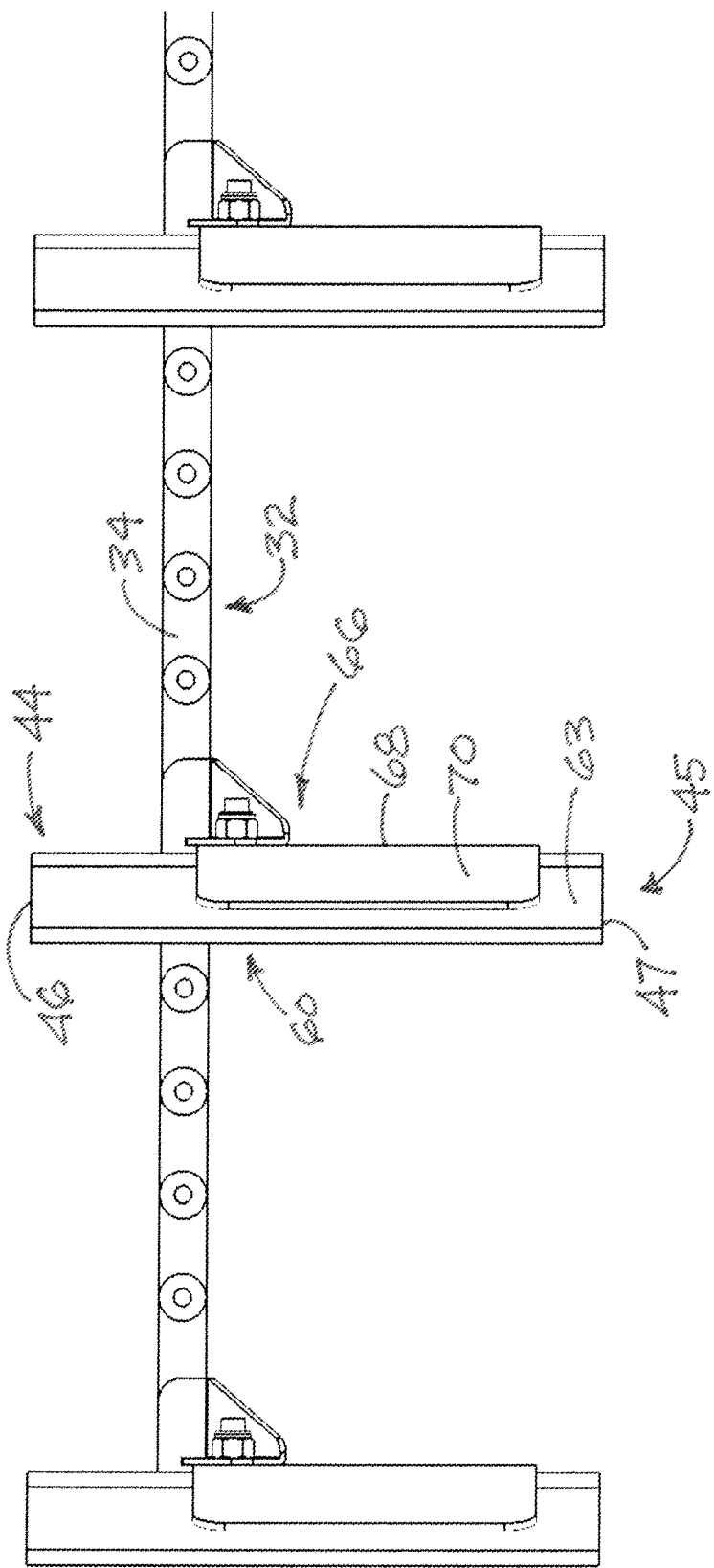
FIG. 4 is a schematic side view of a portion of the succession of contoured paddles, according to an illustrative embodiment.
Figure 5:
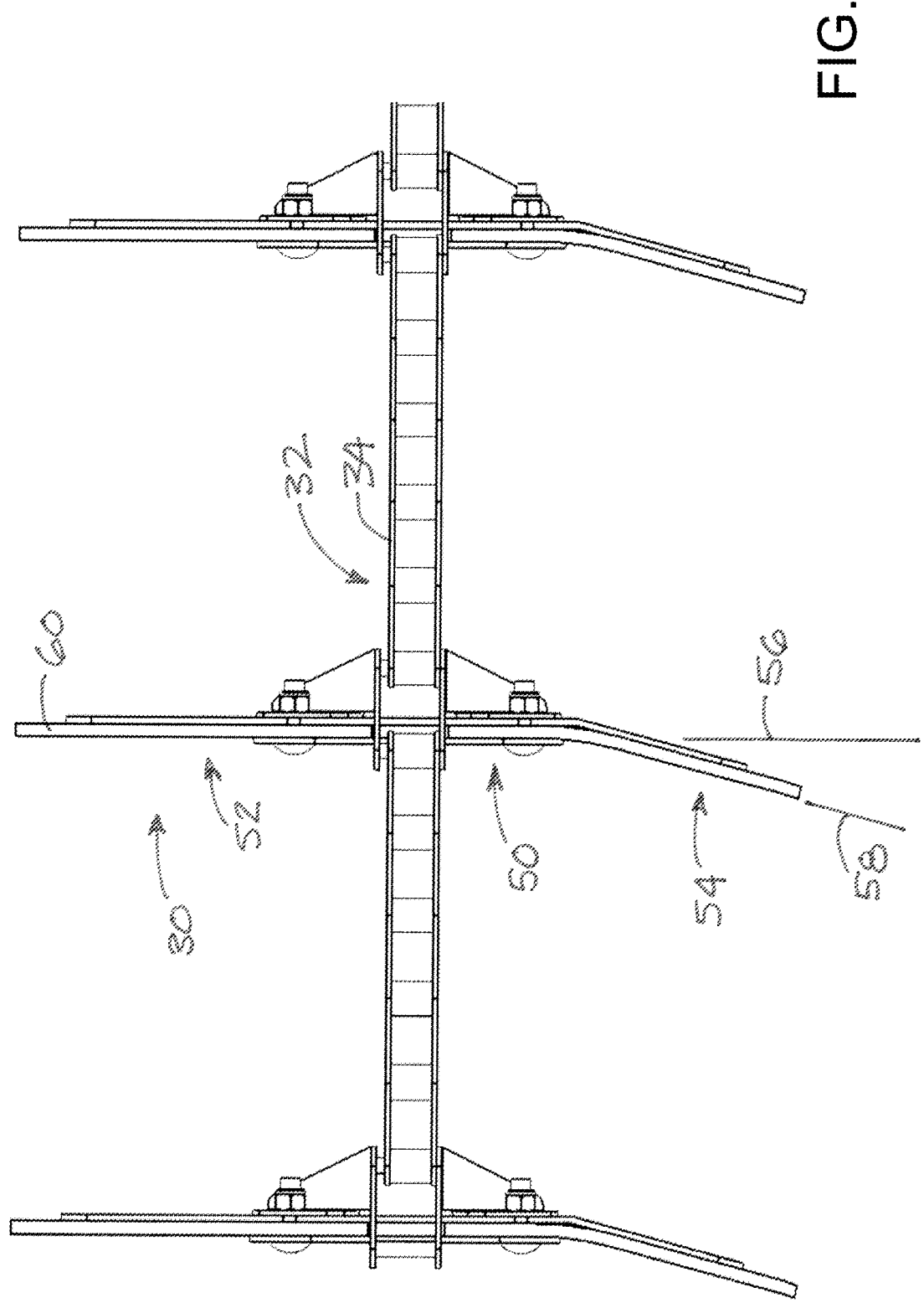
FIG. 5 is a schematic side view of a portion of the succession of contoured paddles, according to an illustrative embodiment.
Figure 6:
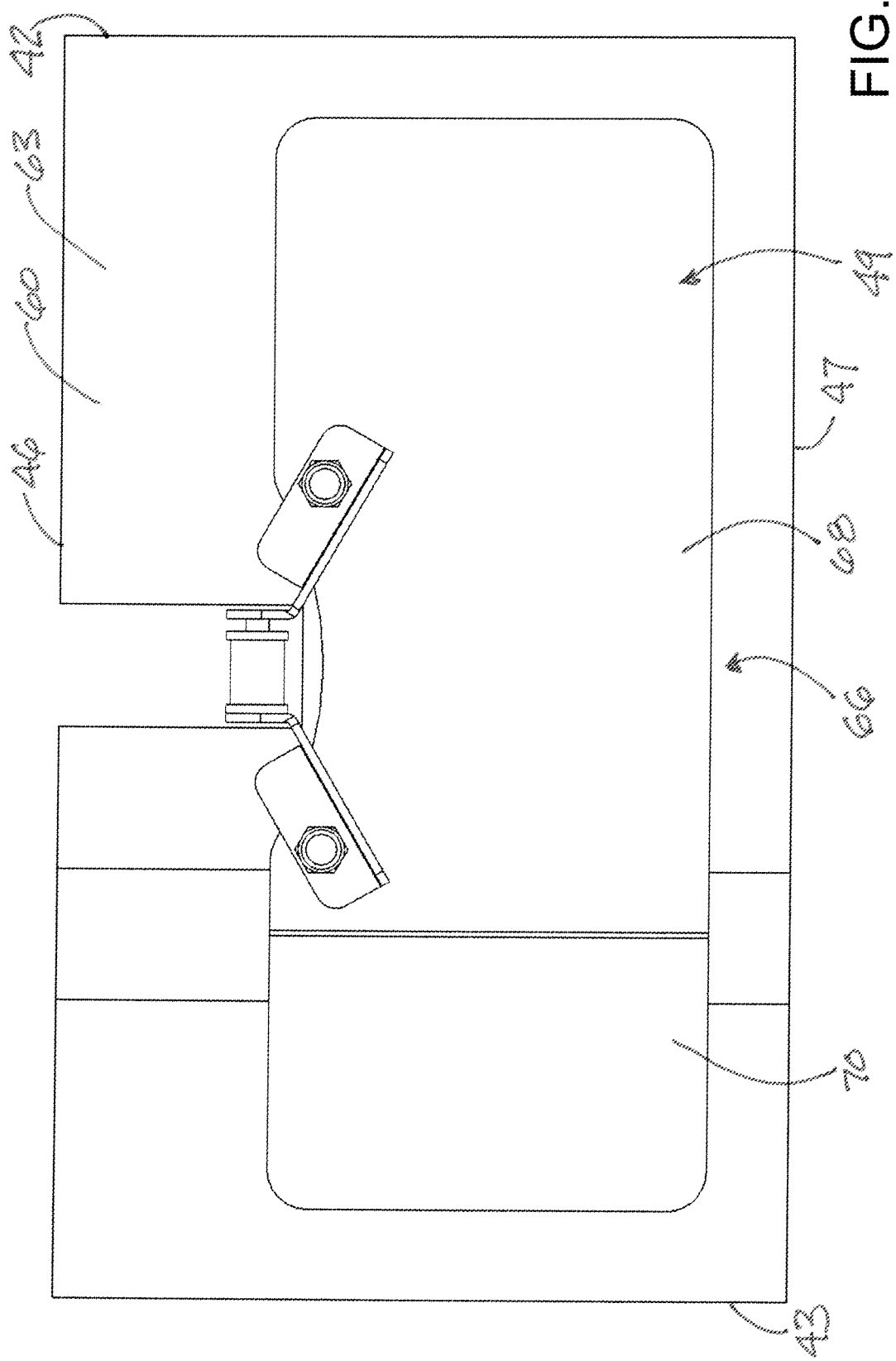
FIG. 6 is a schematic rear view of an exemplary contoured paddle according to an illustrative embodiment.
Figure 7:
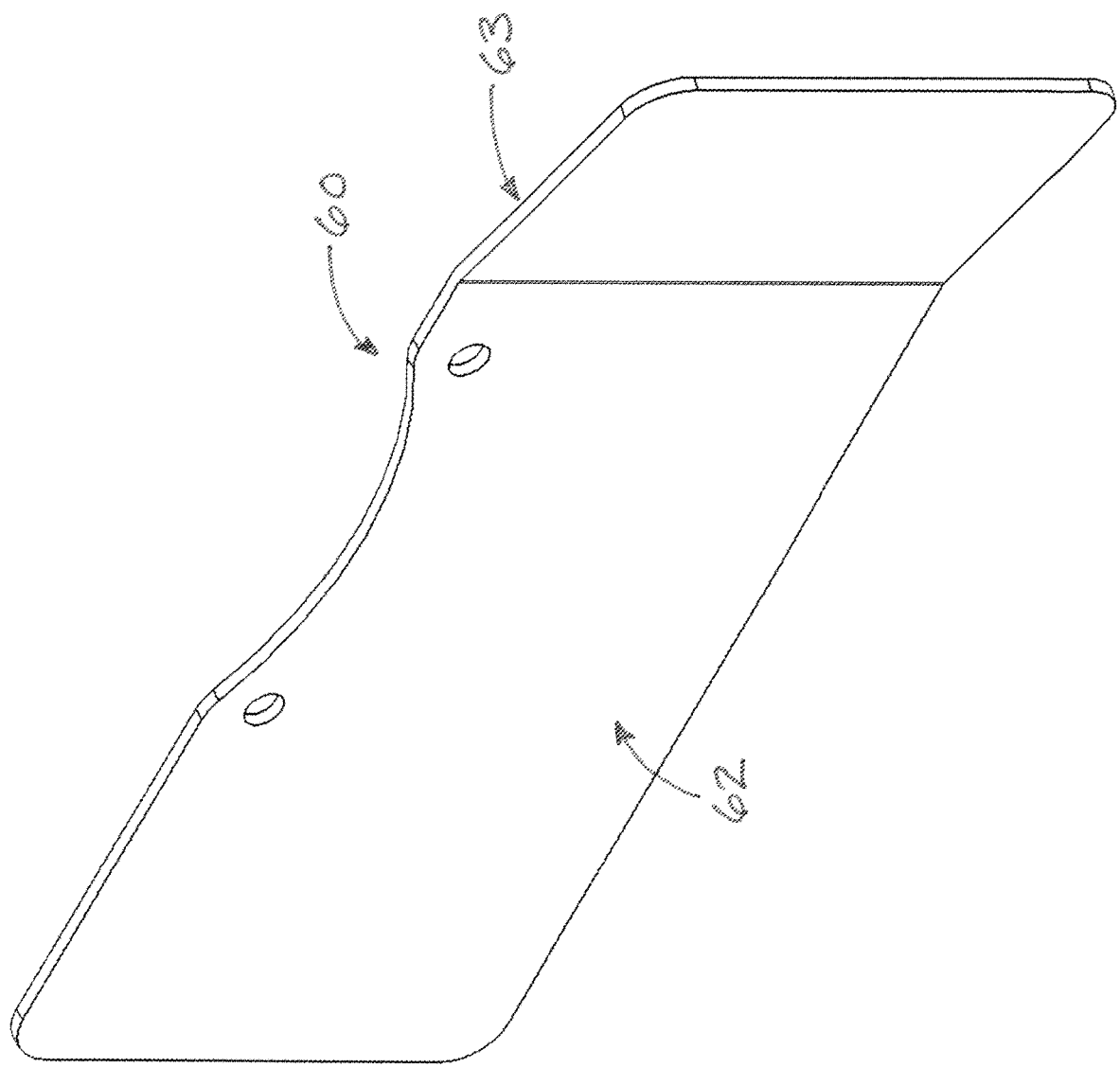
FIG. 7 is a schematic perspective view of a panel of a contoured paddle, according to an illustrative embodiment.
Figure 8:
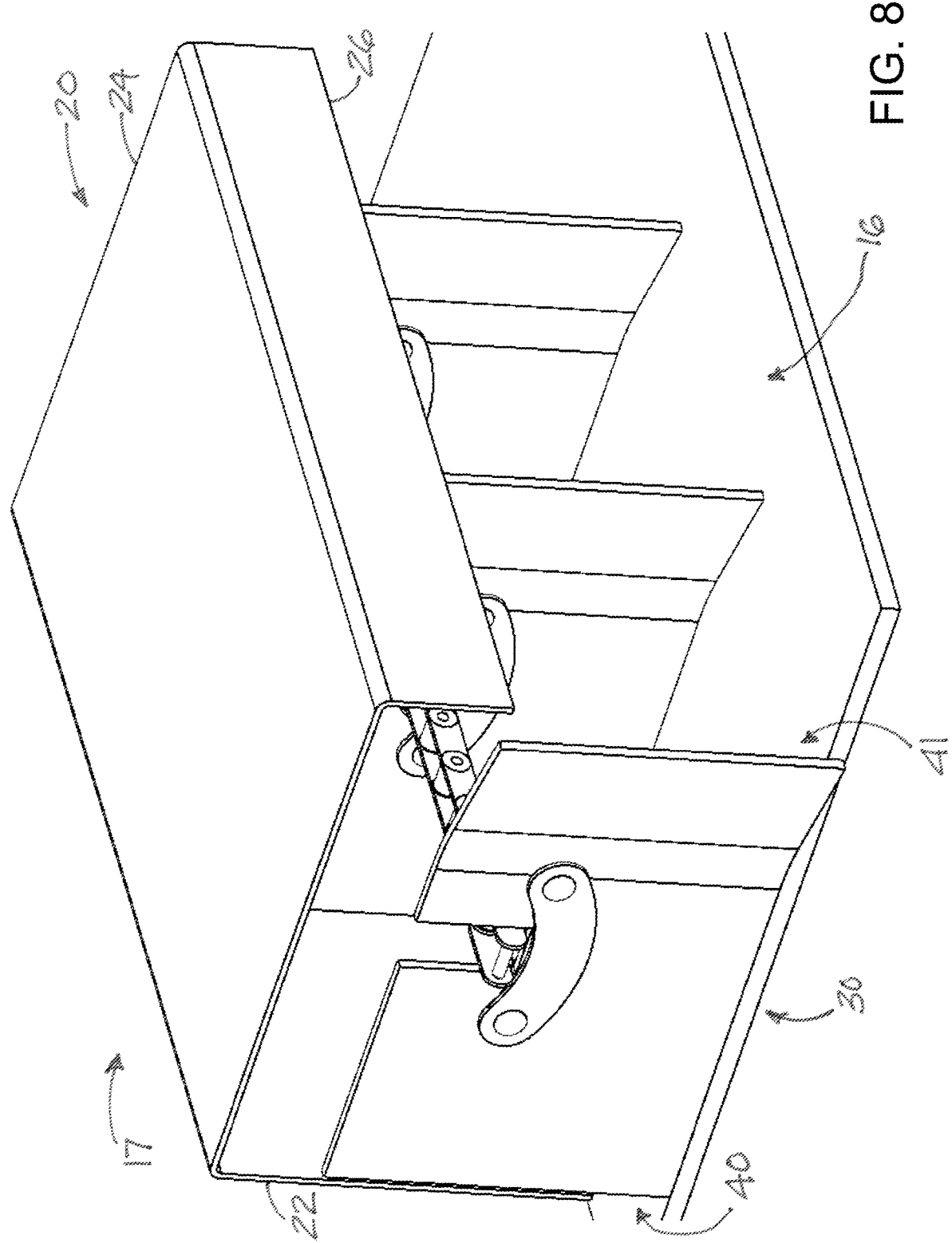
FIG. 8 is a schematic perspective view of a portion of the succession of contoured paddles with elements of the sweep housing, according to an illustrative embodiment.
Figure 9:
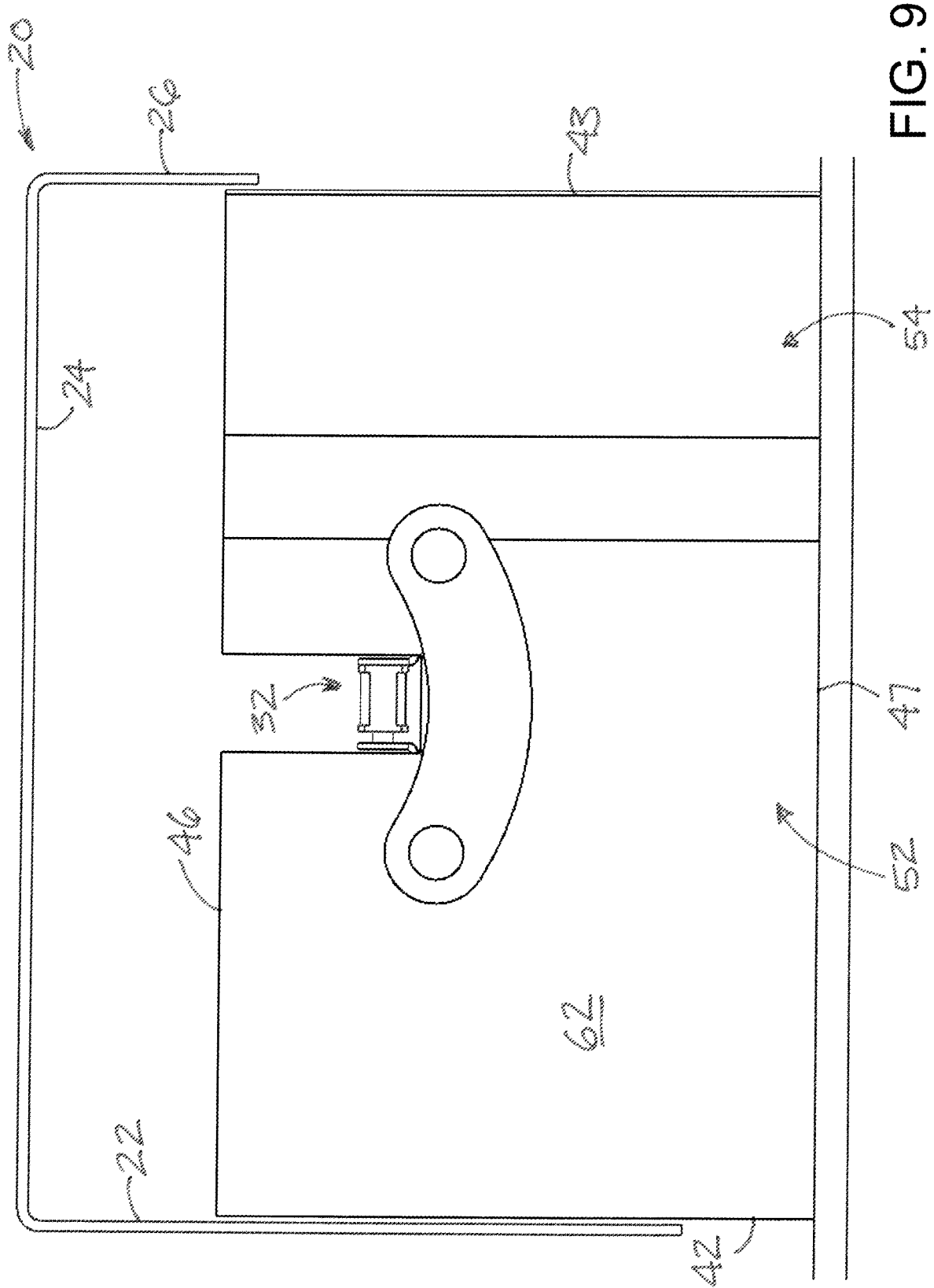
FIG. 9 is a schematic rear view of contoured paddle with elements of the sweep housing, according to an illustrative embodiment.
Figure 10:
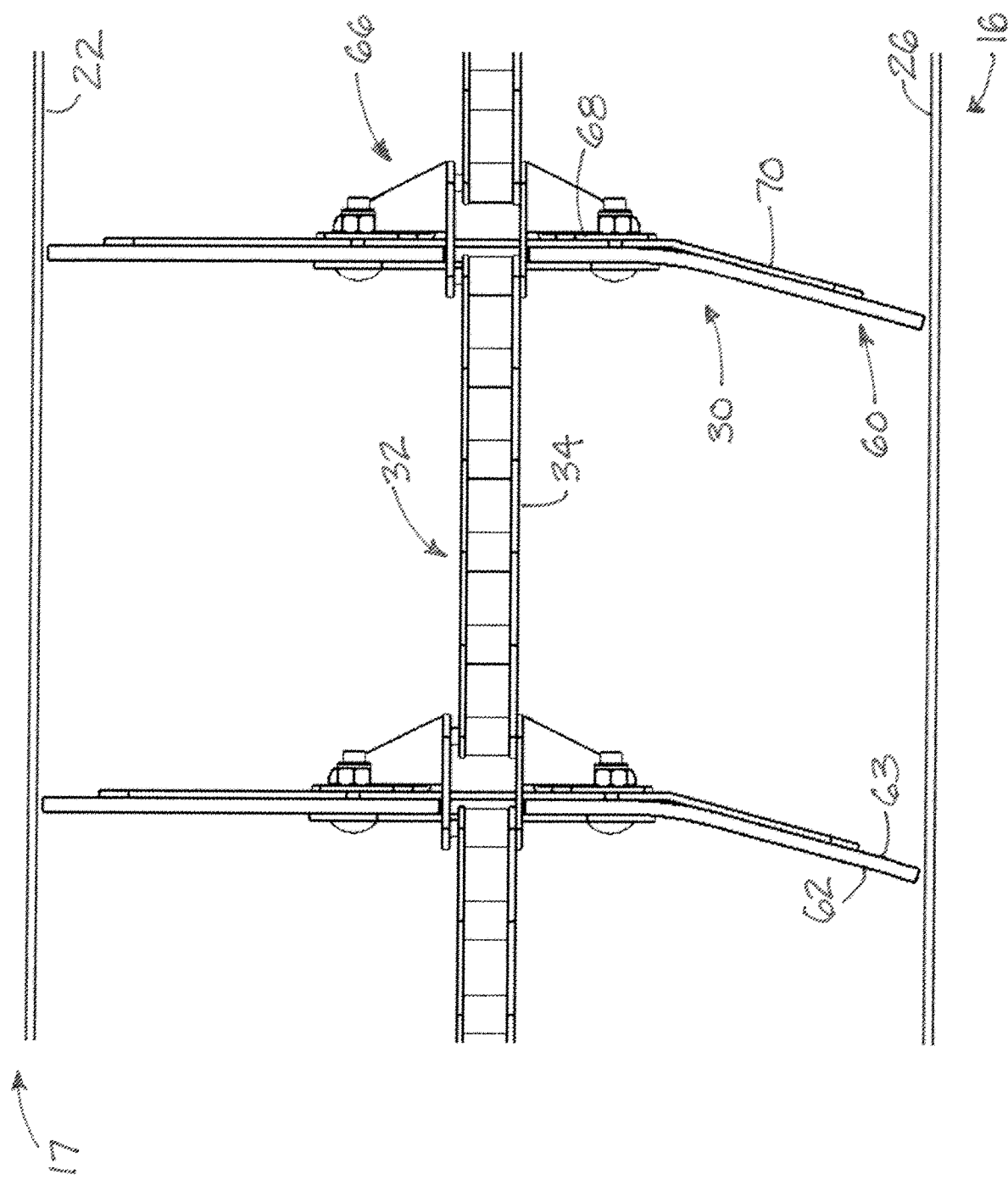
FIG. 10 is a schematic top view of a portion of the succession of contoured paddles with elements of the sweep housing, according to an illustrative embodiment.

With reference now to the drawings, and in particular to FIGS. 1 through 10 thereof, a new bin sweep system with contoured paddles embodying the principles and concepts of the disclosed subject matter will be described.

In one aspect, the disclosure relates to a storage bin sweep system 10 which utilizes paddles to sweep particles across the floor surface of the bin, typically toward a sump which is located at a central area of the floor surface of the bin from peripheral areas of the floor surface of the bin. Such sweep systems are often utilized in bins holding grains, but may also be utilized for moving virtually any type of particulate material.

The illustrative system 10 may include a sweep assembly 12 which is typically elongated with an inboard end 14 for locating toward the central area of the bin and an outboard end 15 for locating toward the peripheral area of the bin, and the sweep assembly may rotate about the central area such that the length of the assembly 12 and the outboard end move in a substantially circular path. The inboard end 14 may be positioned over or adjacent to a sump formed in the floor of the bin into which the particles are to be moved for further handling to exit the bin. The sweep assembly may have a forward side 16 which is oriented toward the direction of movement of the assembly 12, and a rearward side 17 which is oriented away from the direction of movement of the assembly 12.

The sweep assembly 12 may have a sweep housing 20 which may extend between the inboard 14 and outboard 15 ends of the assembly 12. Illustratively, the sweep housing may include a rearward wall 22 extending downwardly toward the floor surface of the bin beneath the sweep assembly and which may be substantially vertically oriented. The sweep housing 20 may also include an upper wall 24 which is oriented substantially horizontally and substantially perpendicularly with respect to the rearward wall. Further, the sweep housing 20 may include a forward lip wall 26 which extends generally downwardly from the upper wall 24 in a substantially vertically orientation which may be substantially parallel to the rearward wall 22. While the rearward wall may extend downwardly to a point closely adjacent to the floor surface, the lowermost extent of the lip wall may define a significant gap with the floor surface. It will be recognized that the sweep housing may include additional elements not identified as a part of this description.

The sweep assembly 12 may also include a plurality of paddles 30 which are movable on a path extending along at least a portion of the sweep assembly between the inboard and outboard ends in a generally inward movement direction toward the central area of the bin in which the sweep assembly is installed. The plurality of paddles 30 may be arrayed along a line extending between the inboard and outboard ends of the assembly 12 and may be positioned forwardly of the rearward wall 22 of the sweep housing to cause movement of particles moving through the gap defined by the lip wall 26 particularly as the sweep assembly is moving in a forward direction. An endless loop member 32 may be mounted on the sweep housing and have the plurality of paddles mounted thereon at spaced locations along the endless loop. The endless loop member may comprise a series of interconnected links 34 providing flexibility for the member 32, and illustratively the loop member comprises a chain of links with the paddles 30 being connected to spaced links.

In greater detail, each of the paddles 30 has an inboard side 40 and an outboard site 41, with the inboard side 40 being located toward the rearward side 17 of the sweep assembly and the outboard site 41 being located toward the forward side 16 of the assembly 12. Correspondingly, each of the paddles 30 may have an inboard edge 42 located at the inboard side 40 and an outboard edge 43 located at the outboard side 41. Each of the paddles 30 may also have a top 44 and a bottom 45 which is located in close proximity to the floor surface of the bin, and may contact and be dragged across the floor surface by movement of the loop member. The paddles may also have a top edge 46 at the top 44 and a bottom edge 47 at the bottom 45.

Further, each of the paddles may have a front 48 and a rear 49, with the front being oriented toward the direction of movement of the paddles during operation of the sweep assembly and the rear 49 being oriented away from the movement direction of the paddles. A front surface 50 may be located on the front 48 of the paddles.

For at least one of the paddles, and suitably each of the paddles, the front surface 50 may be contoured in a manner which tends to urge particles located forward of the paddle to move toward the rearward side 17 of the sweep assembly as the paddle moves toward the inboard end 14 of the sweep assembly and contacts the particles (or contacts particles which in turn contact other particles) to urge them in the rearward direction. Such functionality may be accomplished by a section of the front surface extending forwardly of another section of the front surface so that the section is located more forward (e.g., to a greater degree in the forward direction) as compared to the other section of the front surface. The forward section may be located toward the outboard side 41 of the paddle, and may extend from the outboard end edge 43 toward the inboard side 40 of the paddle, while the other section may be located between the forward section and the inboard side.

In the illustrative embodiments, the front surface 50 may have a pushing section 52 and a diverting section 54 which is contoured to extend forwardly with respect to the pushing section. The pushing section 52 may be located toward the inboard side 40 of the paddle and the diverting section may be located toward the outboard side 41. The diverting section 54 may extend inwardly from the outboard side 41 of the paddle toward the inboard side, and may extend from the top 44 to the bottom 45 of the paddle. In some implementations, the diverting section 54 may occupy approximately one half or less of the total surface area of the front surface of the paddle, and in some further embodiments may occupy approximately one third of the total surface area.

In some illustrative embodiments, the pushing section 52 may be substantially planar and may extend generally in a first plane 56, and in some embodiments substantially entirely in the first plane. The first plane 56 may be oriented substantially perpendicular to the movement direction of the paddle during operation of the sweep assembly, and substantially perpendicular to the portion of the length of the loop member to which the paddle is mounted. The diverting section 54 of the front surface may extend generally in a second plane 58, and the second plane may be oriented at an oblique angle to the first plane 56. Illustratively, the angle between the first plane and the second plane may be approximately 45 degrees or less, and may be approximately 30 degrees or less, and still further may be in a range of approximately 5 degrees to approximately 20 degrees.

Illustrative paddles may include a panel 60 which has a front face oriented toward the front of the paddle and a rear face 63 oriented toward the rear of the paddle. The front face 62 of the panel 60 may form the front surface 50 of the paddle. The panel 60 may be formed of a flexible material which extends from the inboard edge 42 to the outboard edge 43 of the paddle, and may also extend from the top edge 46 to the bottom edge 47. A notch may be formed in the panel along the top edge for passage of a portion of the loop member therethrough.

Paddles may also include a bracket 66 configured to mount the panel 60 on the loop member 32. The bracket of the panel may be positioned adjacent to the rear face 63 of the panel although portions of the bracket may also extend adjacent to the front face, such as to provide opposite mounting points for a fastener passing through the bracket as well as the panel. The bracket 66 may be mounted on one of the links of the loop member, and may be configured to orient at least the portion of the panel having the pushing section 52 of the front surface in a perpendicular relationship to the loop member. In greater detail, the bracket 66 may include a connection portion 68 which is configured to connect to the endless loop member and may extend substantially parallel to the first plane 56 of the front surface and also be oriented substantially perpendicular to the loop member.

In some embodiments, the bracket 66 may be configured to shape or contour at least a portion of the flexible material forming the panel 60 so that the diverting section 54 of the paddle formed by the panel is contoured in the manner described, such as by extending substantially parallel to the second plane. The bracket may include a shaping portion 70 which extends from the connection portion 68 to contour the panel. Illustratively, at least the shaping portion 70 of the bracket 66 may be formed of a substantially rigid material that tends to deflect and hold in deflection a portion of the flexible material forming the panel to provide the diverting section 54 with the desired contouring with respect to the pushing section. Thus, the flexibility of the material forming the panel, in combination with the shaping portion 70 of the bracket, tends to contour at least the diverting 54 section of the front surface. It will be recognized by those in the art that the configuration of the front surface of the paddle with the pushing and diverting sections may be created using suitable structures other than the combination of a flexible panel and a rigid bracket, such as, for example, a panel that is molded or cast or machined or printed with the configuration that provides suitable contouring as disclosed herein.

Advantages of bin sweeps utilizing paddles having one or more characteristics set forth in this disclosure may include an enhanced ability of the paddles to retain more of the particles positioned forward of the paddle in the general flow of particles created by the plurality of paddles. Features of the disclosed paddles may reduce the amount of particles that are able to escape the influence of the paddles resulting from the particles, for example, slipping by the outboard side of the paddle as a paddle moved forwardly. While the rearward wall 22 of the sweep housing typically restricts the ability of particles to slip by the inboard side 40 of the paddle, no corresponding structure is present at the outboard side of the paddle due to the need to allow particles to freely move into the sweep from the forward side 16. While the "pile" of particles positioned forwardly of the sweep as the moves forward tends to provide some degree of limitation on the particles being able to slip from the influence of the paddle in the forward direction, the contouring of the paddle, particularly at the outboard side of the paddle, may substantially increase the ability of the paddles to retain the particles located forwardly of the paddle but toward the outboard side, and thus permits particles directly contacted by the paddle, as well as other particles pushed ahead by those particles in contact with the paddle, to be carried along the length of the bin sweep with minimize the loss of particles from the general flow of particles.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An article for sweeping particles by a storage bin sweep assembly moving in a forward direction across a floor surface of a bin, the sweep assembly including a forward side oriented toward the forward direction and a rearward side with a rearward wall located toward the rearward side and extending downwardly toward the floor surface below the sweep assembly, the article comprising:

a paddle mountable on the sweep assembly as one of a plurality of paddles movable on a path extending along at least a portion of a length of the sweep assembly between inboard and outboard ends of the assembly;

the paddle having a front with a front surface oriented toward a movement direction of the plurality of paddles and a rear oriented away from the movement direction of the plurality of paddles, the paddle having an inboard side for locating toward the rearward side of the sweep assembly and an outboard side located toward the forward side of the sweep assembly, the paddle having a bottom for positioning adjacent to the floor surface of the bin and a top opposite of the bottom;

the front surface of the paddle being contoured in a manner to urge particles located forward of the paddle toward the inboard side of the paddle as the paddle moves toward the inboard end of the sweep assembly for urging particles to move toward the rearward side of the sweep assembly when the paddle is moved along the path of the plurality of paddles;

the front surface of the paddle having a pushing section located toward the inboard side of the paddle and a diverting section located toward the outboard side of the paddle;

a portion of the pushing section of the front surface extending from the inboard side toward the outboard side and extending upwardly toward the top of the paddle and downwardly toward the bottom of the paddle;
a portion of the diverting section of the front surface extending from the outboard side toward the inboard side and extending upwardly toward the top of the paddle and downwardly toward the bottom of the paddle;
wherein the portion of the pushing section of the front surface is flat and extends substantially entirely in a first plane oriented perpendicular to the movement direction of the paddle when positioned in the plurality of paddles;
wherein the portion of the diverting section of the front surface is flat and extends substantially entirely in a second plane oriented at an oblique angle to the first plane;
wherein the paddle has a bottom edge at the bottom of the paddle, an extent of the bottom edge of the paddle extending along the portion of the pushing section;
wherein the paddle has an inboard edge at the inboard side of the paddle, an extent of the inboard edge of the paddle having a uniform thickness and extending along the portion of the pushing section; and
wherein the extent of the bottom edge of the paddle is oriented substantially perpendicular to the extent of the inboard edge of the paddle to facilitate sweeping by the paddle of particles on the floor surface of the bin along the rearward wall of the sweep assembly.

2. The article of claim 1 wherein the pushing section of the front surface of the paddle extends from the bottom of the paddle to the top of the paddle.

3. The article of claim 1 wherein the diverting section of the front surface of the paddle extends from the bottom of the paddle to the top of the paddle.

4. The article of claim 1 wherein the diverting section of the front surface of the paddle occupies approximately one half of a total surface area of the front surface or less.

5. The article of claim 1 wherein substantially an entirety of the pushing section of the front surface of the paddle is flat and substantially an entirety of the diverting section of the front surface of the paddle is flat.

6. The article of claim 1 wherein the paddle comprises:
a panel having a front face toward the front of the paddle and a rear face toward the rear of the paddle, the front face of the panel forming the front surface of the paddle; and
a bracket for mounting on an endless loop member of the sweep assembly, the bracket being positioned adjacent to the rear face of the panel portion.

7. The article of claim 6 wherein the panel is formed of a flexible material and the panel is mounted on the bracket, the bracket being shaped to contour the diverting section of the front surface with respect to the pushing section of the front surface.

8. The article of claim 6 wherein the bracket includes:
a connection portion and configured to be connected to the endless loop member of the sweep assembly; and
a shaping portion extending from the connection portion and configured to deflect the portion of the diverting section of the front surface of the panel from the first plane to the second plane while the portion of the pushing section of the front surface of the panel remains in the first plane.

9. The article of claim 1 wherein the extent of the bottom edge of the paddle and the extent of the inboard edge of the paddle are each substantially straight.

10. The article of claim 9 wherein the paddle has a top edge at the top of the paddle, the top edge being oriented substantially parallel to the bottom edge.

11. The article of claim 1 wherein the paddle has an outboard edge at the outboard side of the paddle, the outboard edge being oriented substantially perpendicular to the bottom edge.

12. The article of claim 1 wherein the paddle has a substantially rectangular perimeter edge.

13. The article of claim 1 wherein the extent of the bottom edge of the paddle and the extent of the inboard edge of the paddle converge together at a perpendicular angle.

14. An article for sweeping particles by a storage bin sweep assembly moving in a forward direction across a floor surface of a bin, the sweep assembly including a forward side oriented toward the forward direction and a rearward side with a rearward wall located toward the rearward side and extending downwardly toward the floor surface below the sweep assembly, the article comprising:
a paddle mountable on the sweep assembly as one of a plurality of paddles movable on a path extending along at least a portion of a length of the sweep assembly between inboard and outboard ends of the assembly;
the paddle having a front with a front surface oriented toward a movement direction of the plurality of paddles and a rear oriented away from the movement direction of the plurality of paddles, the paddle having an inboard side for locating toward the rearward side of the sweep assembly and an outboard side located toward the forward side of the sweep assembly, the paddle having a bottom for positioning adjacent to the floor surface of the bin and a top opposite of the bottom;
the front surface of the paddle being contoured in a manner to urge particles located forward of the paddle toward the inboard side of the paddle as the paddle moves toward the inboard end of the sweep assembly for urging particles to move toward the rearward side of the sweep assembly when the paddle is moved along the path of the plurality of paddles;
the front surface of the paddle having a pushing section located toward the inboard side of the paddle and a diverting section located toward the outboard side of the paddle;
a portion of the pushing section of the front surface extending from the inboard side toward the outboard side and extending upwardly toward the top of the paddle and downwardly toward the bottom of the paddle;
a portion of the diverting section of the front surface extending from the outboard side toward the inboard side and extending upwardly toward the top of the paddle and downwardly toward the bottom of the paddle;
wherein the portion of the pushing section of the front surface extends substantially entirely in a first plane;
wherein the portion of the diverting section of the front surface extends forwardly of the first plane of the portion of the pushing section of the front surface;
wherein the paddle has a bottom edge at the bottom of the paddle, an extent of the bottom edge of the paddle positioned along the portion of the pushing section extending from the inboard side of the paddle toward the outboard side of the paddle, the extent of the bottom edge having a uniform thickness;
wherein the paddle has an inboard edge at the inboard side of the paddle, an extent of the inboard edge of the paddle positioned along the portion of the pushing section extending from the bottom edge of the paddle toward the top of the paddle, the extent of the inboard edge having a uniform thickness; and wherein the extent of the bottom edge of the paddle is oriented perpendicular to the extent of the inboard edge of the paddle to facilitate sweeping by the paddle of particles on the floor surface of the bin along the rearward wall of the sweep assembly.

15. The article of claim 14 wherein the pushing section of the front surface of the paddle extends from the bottom of the paddle to the top of the paddle.

16. The article of claim 14 wherein the diverting section of the front surface of the paddle extends from the bottom of the paddle to the top of the paddle.

17. The article of claim 14 wherein the diverting section of the front surface of the paddle occupies approximately one half of a total surface area of the front surface or less.

18. The article of claim 14 wherein substantially an entirety of the pushing section of the front surface of the paddle is flat and substantially an entirety of the diverting section of the front surface of the paddle is flat.

19. The article of claim 14 wherein the extent of the bottom edge of the paddle and the extent of the inboard edge of the paddle converge together at a perpendicular angle.

20. An article for sweeping particles by a storage bin sweep assembly moving in a forward direction across a floor surface of a bin, the sweep assembly including a forward side oriented toward the forward direction and a rearward side with a rearward wall located toward the rearward side and extending downwardly toward the floor surface below the sweep assembly, the article comprising:

a paddle mountable on the sweep assembly as one of a plurality of paddles movable on a path extending along at least a portion of a length of the sweep assembly between inboard and outboard ends of the assembly;

the paddle having a front with a front surface oriented toward a movement direction of the plurality of paddles and a rear oriented away from the movement direction of the plurality of paddles, the paddle having an inboard side for locating toward the rearward side of the sweep assembly and an outboard side located toward the forward side of the sweep assembly, the paddle having a bottom for positioning adjacent to the floor surface of the bin and a top opposite of the bottom;

the front surface of the paddle being contoured in a manner to urge particles located forward of the paddle toward the inboard side of the paddle as the paddle moves toward the inboard end of the sweep assembly for urging particles to move toward the rearward side of the sweep assembly when the paddle is moved along the path of the plurality of paddles;

the front surface of the paddle having a pushing section located toward the inboard side of the paddle and a diverting section located toward the outboard side of the paddle;

a portion of the pushing section of the front surface extending from the inboard side toward the outboard side and extending upwardly toward the top of the paddle and downwardly toward the bottom of the paddle;

a portion of the diverting section of the front surface extending from the outboard side toward the inboard side and extending upwardly toward the top of the paddle and downwardly toward the bottom of the paddle;

wherein the portion of the pushing section of the front surface is flat and extends substantially entirely in a first plane oriented perpendicular to the movement direction of the paddle when positioned in the plurality of paddles;

wherein the portion of the diverting section of the front surface is flat and extends substantially entirely in a second plane oriented at an oblique angle to the first plane;

wherein the paddle has a bottom edge at the bottom of the paddle, an extent of the bottom edge of the paddle being a free edge and having a uniform thickness and extending along the portion of the pushing section;

wherein the paddle has an inboard edge at the inboard side of the paddle, an extent of the inboard edge of the paddle being a free edge and having a uniform thickness and extending along the portion of the pushing section; and wherein the extent of the bottom edge of the paddle is oriented substantially perpendicular to the extent of the inboard edge of the paddle to facilitate sweeping by the paddle of particles on the floor surface of the bin along the rearward wall of the sweep assembly.

* * * * *